E. B. BABBITT.
LOCKING DEVICE FOR STEERING GEARS.
APPLICATION FILED MAY 1, 1915.
1,168,701.
Patented Jan. 18, 1916.
2 SHEETS—SHEET 1.
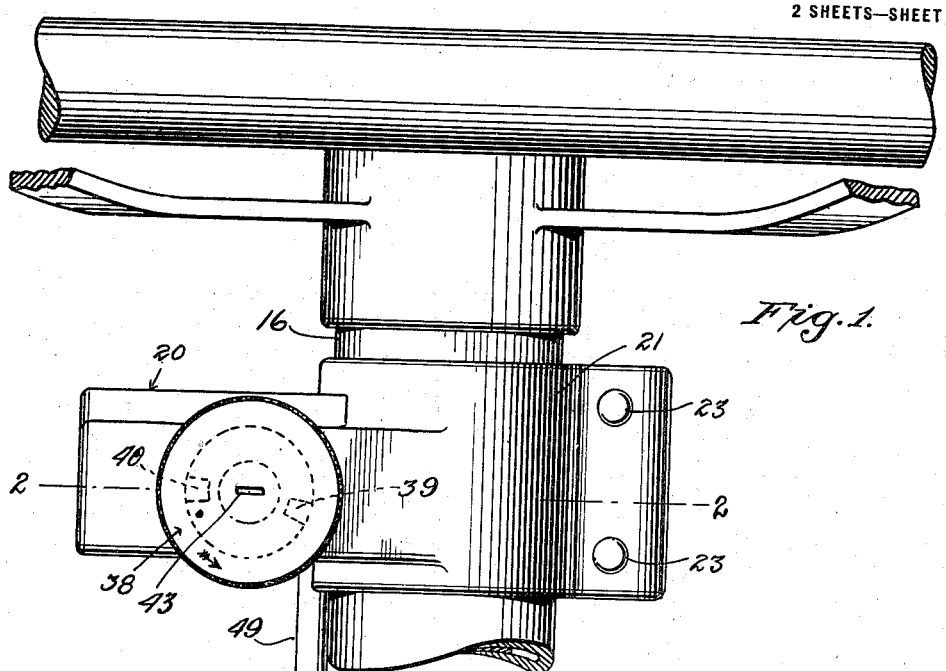
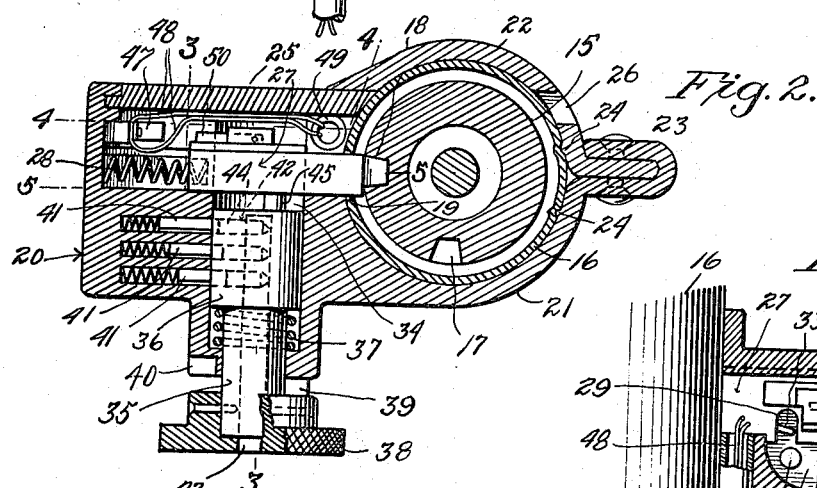
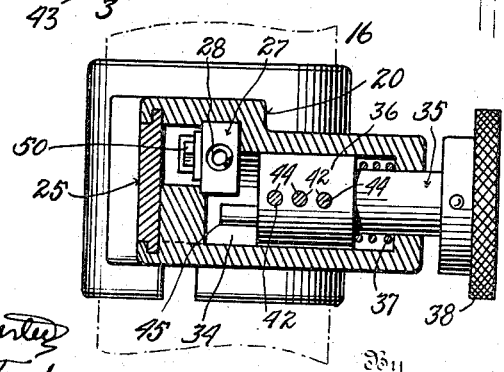
Witnesses
Inventor
Edwin B. Babbitt
Henry T. Bright
Attorney E. B. BABBITT.
LOCKING DEVICE FOR STEERING GEARS.
APPLICATION FILED MAY 1, 1915.
1,168,701.
Patented Jan. 18, 1916.
2 SHEETS—SHEET 2.
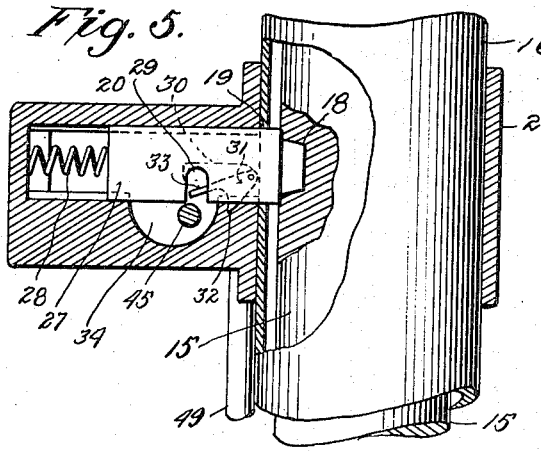
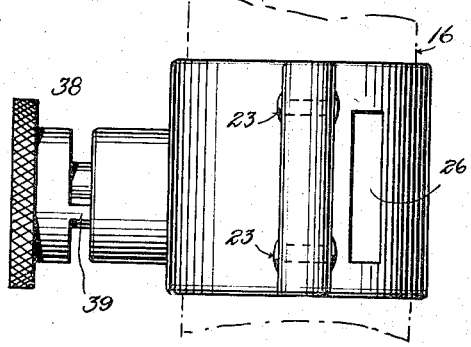
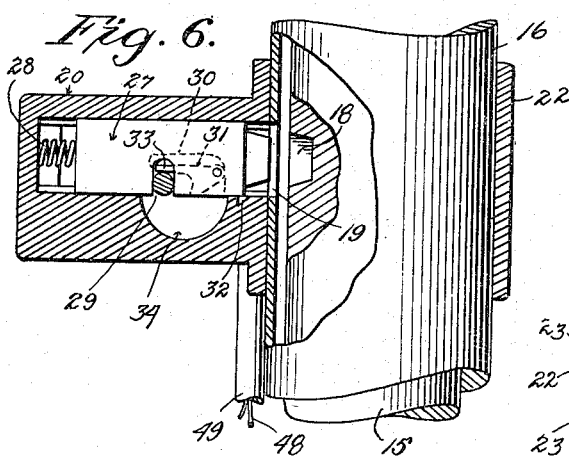
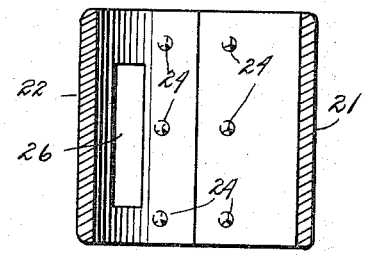
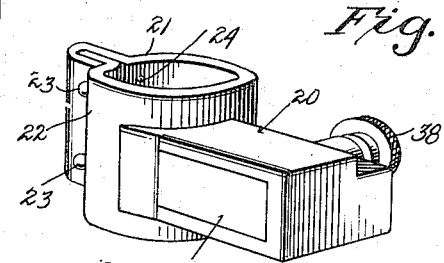
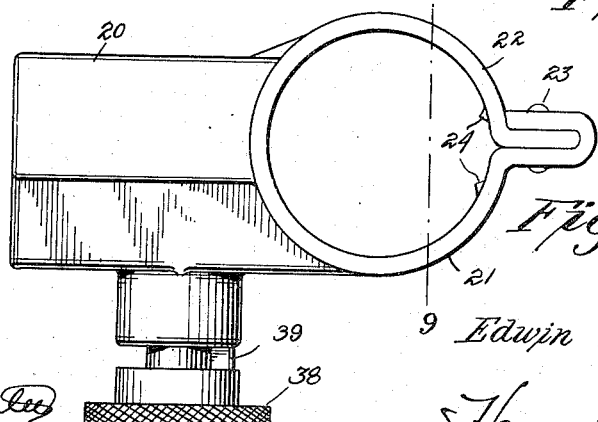
Witnesses
Inventor
Edwin B. Babbitt
Henry T. Bright
By
Attorney

UNITED STATES PATENT OFFICE.

EDWIN B. BABBITT, OF WASHINGTON, DISTRICT OF COLUMBIA.

LOCKING DEVICE FOR STEERING-GEARS.

1,168,701.  Specification of Letters Patent.  Patented Jan. 18, 1916.

Application filed May 1, 1915. Serial No. 25,197.

*To all whom it may concern:*

Be it known that I, EDWIN B. BABBITT, a citizen of the United States, and resident of the city of Washington, in the District of Columbia, have invented certain new and useful Improvements in Locking Devices for Steering-Gears, of which the following is a specification.

This invention relates to locking devices for steering gears and is particularly designed for use in connection with the steering gears of motor vehicles, although it is applicable for use in connection with any steering gear embodying a steering column and a steering shaft.

In carrying out my invention it is my purpose to provide a locking device of the character named through the instrumentality of which the steering shaft can be easily and quickly locked against rotation so that, in the case of a motor vehicle, same cannot be operated by its own power and cannot be moved by towing, thus effectively guarding against the theft of the vehicle by either means.

It is my further purpose to provide a locking device of this character embodying an improved construction wherein the operation of the device to an unlocked status will close the ignition circuit of a motor vehicle, while the operation of the device to a locked status will open such circuit and thereby materially increase the obstacles to be overcome in effecting a successful theft.

It is also my purpose to so construct the locking device that the locking bolt thereof can be operated to locked position without the use of a key, thereby providing an obvious advantage when the occupant of a motor vehicle desires to lock the steering gear at a time when he is in haste, it being essential to the construction however that a key be employed to effect retraction of the bolt to unlocked position.

It is also my purpose to provide a locking device of the character named which will embody the desired features of simplicity and efficiency, and which, having but comparatively few parts easily assembled, may be manufactured and marketed at a relatively low cost.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a view in elevation of my improved locking device associated with the steering gear of a motor vehicle; Fig. 2, a section on the line 2—2 of Fig. 1; Fig. 3, a section on the line 3—3 of Fig. 2; Fig. 4, a section on the line 4—4 of Fig. 2; Fig. 5, a section on the line 5—5 of Fig. 2 with the bolt in locked position; Fig. 6, a view similar to Fig. 5 with the bolt retracted; Fig. 7, a plan view of the locking device removed from the steering column; Fig. 8, a view looking at the right hand end of Fig. 7; Fig. 9, a section on the line 9—9 of Fig. 7, and Fig. 10, a perspective view of the device removed from the steering column.

Referring to the drawings 15 indicates the steering shaft and 16 the steering column of a motor vehicle. The steering shaft 15 is provided in its periphery with recesses 17 and 18 in which the bolt of my improved lock is adapted to be selectively engaged to secure the steering shaft 15 against rotation. While the number of recesses in the steering shaft may be varied I have in this instance shown two such recesses so located that when the bolt of the lock is engaged in the recess 17 the steering shaft will be positioned to effect steering to the right, while on the other hand when the bolt is engaged in the recess 18, as shown in Fig. 2, the steering shaft will be positioned to effect steering to the left. The steering column 16 is provided with an opening 19 with which the recesses 17 and 18 are adapted to selectively register according to the status of the steering gear.

My improved lock is shown as comprising a casing 20 which has formed on one end thereof strap extensions 21 and 22. These extensions are applied around the steering column and the free ends thereof are bent into interlocking relation and secured together through the medium of rivets 23 or other suitable fastening devices which are passed through the interlocking ends of the extensions. The inner faces of the strap extensions 21 and 22 are provided respectively with a plurality of projections 24 and as these extensions are clamped around the steering column with considerable force the projections will bite into the steering column and effectively secure the casing against any movement relatively to said column. The interior of the casing 20 communicates with the opening 19 in the steering column, while one side thereof is formed by a removable plate 25, said plate being applied after the mechanism of the lock disposed within the casing 20 has been assembled. Before applying the casing to the steering column the extensions 21 and 22 are bent almost to their final shape and provision is made for the application and removal of the plate 25 by providing an opening 26 in the extension strap 22. The application of the casing 20 to the steering column locks the plate 25 against removal as will be obvious. Slidably mounted in the casing 20 in line with the opening 19 is a locking bolt 27 which is normally held in projected position by a spring 28 one end of which bears against the rear end of the bolt and the other end against the casing. This bolt 27 is provided with a transverse recess 29 which opens through the lower edge thereof and is further provided with a longitudinal recess 30, in advance of the recess 29 and communicating with the latter and also opening through the lower edge of the bolt. Pivoted in the recess 30 is a latch 31 adapted to engage in a notch 22 when the bolt is fully projected to lock said bolt against retraction. This latch 31 is particularly useful in preventing retracted movement of the bolt as a result of recoil incident to striking a sharp blow on the casing at the rear of the bolt. The latch 31 includes a tail piece 23 which projects across the recess 29 for a purpose that will presently appear.

The casing 20 is provided with a passage 34 extending at right angles to the bolt, said passage being reduced at the point where it pierces the wall of the casing. Slidably and rotatably mounted in the reduced portion of the passage 34 and also extending into the major portion of said passage is a cylindrical member 35. The inner end of this member 35 terminates in an enlarged head 36 of a diameter substantially equal to the diameter of the major portion of the passage 34. A spring 37 encircles the member 35 and has one end bearing against the head 36 and its other end bearing against the casing 20. This spring constantly tends to move the cylindrical member 35 longitudinally in the direction of the bolt 27, which movement is limited by a head 38 fixed on the outer end of the member 35 and adapted to engage the outer face of the casing 20. The head 38 is provided on its inner end with a lug 39 which is adapted to engage in a recess 40 in the casing 20 when the member 35 has been rotated a predetermined distance whereby said member is locked against rotation in either direction until same is pulled longitudinally against the influence of the spring 37 a sufficient distance to entirely disengage the lug 39 from the recess 40. The member 35 is also adapted to be locked against rotation when in another position by a Yale lock mechanism comprising a plurality of spring pressed tumblers 41 mounted in the casing 20 and adapted to enter respectively recesses 42 in the head 36. The member 35 is provided with a key slot 43 in which a key is adapted to be inserted for the purpose of ejecting the tumblers 41 from the recess 42, such key coöperating with plungers 44 mounted in the recesses 42 all in the usual and well known manner. The end of the head 36 adjacent the bolt 27 has fixed thereon a pin 45 disposed eccentrically with respect to the longitudinal axis of the member 35 whereby said pin will move in a circle during the rotation of said member.

Referring particularly to Fig. 2 it will be seen that the bolt 27 is in projected or locking position and is engaged in the recess 18 so as to prevent rotation of the shaft 15. It will also be seen that the member 35 is locked against rotation by the tumblers 41. If it is desired to retract the bolt 27 and thus release the shaft 15 for rotation the necessary key is inserted in the slot 43 and the member 35 then rotated manually in the direction of the arrow in Fig. 1. The initial rotation of the member 35 will move the pin 45 into the recess 29 where said pin will engage the tail piece 33 of the latch 31 and disengage the latter from the notch 32. Continued rotation of the member 35 will cause the pin 45 to engage the wall of the recess 29 and retract the bolt 27 against the influence of the spring 28. When the bolt is fully retracted the lug 39 alines with the recess 40 and the spring 37 automatically moves the member 35 longitudinally to engage the lug 39 in the recess 40 and thus lock the member 35 against rotation to hold the bolt 27 in retracted position against the influence of the spring 28. When it is desired to release the bolt 27 to locked position the use of a key is not required, it being only necessary to draw the member 35 longitudinally until the lug 39 is out of the recess 40 and continue the rotation of the member 35 in the direction of the arrow in Fig. 1. This continued rotation of the member 35 will disengage the pin 45 from the recess 29 when the bolt 27 will be released to the influence of the spring 28 and automatically move to projected position. Further rotation of the member 35 will then bring the recesses 42 in line with the tumblers 41 when the member 35 will be again locked against rotation until the required key is inserted in the slot 43.

If the desired recess in the shaft 15 is not in line with the bolt 27 when the latter is released to projected position it is only necessary to continue the rotation of the shaft 15 and as soon as the desired recess alines with the bolt the latter will engage therein.

My improved lock further embodies means for breaking the ignition circuit when the shaft 15 is locked and for closing said circuit when the bolt 27 is retracted and the shaft 15 free to rotate to effect the necessary steering of the vehicle. To this end I mount within the casing 20 contacts 46 and 47 to which are secured respectively the conducting wires of the ignition circuit. These wires are guided into the casing 20 through a tubular member 49 extending contiguous with the steering column 15. Mounted on the side of the bolt 27 remote from the member 35 is a switch 50. This switch is so positioned that when the bolt 27 is retracted it will pass between and engage both of the contacts 46 and 47 and thus close the ignition circuit. When the bolt 27 is projected or in locking position the switch 50 passes out of engagement with the contacts 46 and 47 and breaks the ignition circuit thus rendering the operation of the vehicle impossible while the shaft 15 is locked and affording an additional safeguard against possible theft.

While I have shown and described one form of carrying my invention into practice I desire it to be understood that various changes in the form, shape and arrangement of the parts may be resorted to without departing from the scope of my invention as set forth in the appended claims.

What is claimed is:—

1. A lock comprising a casing, a normally projected bolt slidable within the casing, a rotatable and bodily movable member mounted in the casing and adapted during its rotation to retract the bolt, and automatic means for moving the member bodily into interlocking relation with the casing when the bolt is fully retracted.

2. A lock comprising a casing, a normally projected bolt slidable in the casing, a rotatable and bodily movable member adapted to interlock with and retract the bolt during its rotation and to detachably interlock with the casing by bodily movement thereof when the bolt is fully retracted, and key released means for locking said member against rotation when the bolt is in projected position.

3. A lock comprising a casing, a normally projected bolt slidable in the casing, a rotatable member mounted in the casing and adapted during each revolution to successively engage, retract and disengage from the bolt, means for releasably locking the member against rotation when same is engaged with the bolt and the latter is fully retracted, and key released means for locking the member against rotation when same has reached a predetermined position after the release of the bolt.

4. A lock comprising a casing having a recess in the wall thereof, a normally projected bolt slidable in the casing, a rotatable and bodily movable member mounted in the casing and adapted during its rotation to interlock with and retract the bolt, means constantly tending to move the member bodily inwardly of the casing, a head on said member exteriorly of the casing for limiting its bodily movement under the influence of said means, and a lug on said head engageable in the recess in the casing when the bolt is fully retracted to lock the member against rotation and the bolt against projection.

5. A lock comprising a casing, a normally projected bolt slidable within the casing, a rotatable and bodily movable member mounted in the casing and adapted during its rotation to retract the bolt, and automatic means for moving the member bodily into interlocking relation with the casing when the bolt is fully retracted, said member being operated out of interlocking relation with the casing by manually effected bodily movement thereof in the opposite direction.

In testimony whereof, I affix my signature, in the presence of two witnesses.

EDWIN B. BABBITT.

Witnesses:
  N. F. RAMSEY,
  A. Y. LEECH, Jr.